United States Patent [19]

Parliment

[11] Patent Number: 4,618,501
[45] Date of Patent: Oct. 21, 1986

[54] FLAVORING WITH α, β-KETO-IMINES

[75] Inventor: Thomas H. Parliment, New City, N.Y.

[73] Assignee: General Foods Corporation, White Plains, N.Y.

[21] Appl. No.: 737,852

[22] Filed: May 28, 1985

[51] Int. Cl.$^4$ ............................................. A23L 1/226
[52] U.S. Cl. .................................. 426/534; 564/278; 564/279
[58] Field of Search ................ 564/278, 279; 426/534, 426/535

[56]  References Cited

U.S. PATENT DOCUMENTS 3,625,710  12/1971  Rizzi ............................... 564/278 X

OTHER PUBLICATIONS

CAS Registry Handbook, 1979, 69081-06-7.
Chemical Abstracts, 97:5773s (1982).
Chemical Abstracts, 90:7213f (1979).

Primary Examiner—Joseph Golian
Attorney, Agent, or Firm—Richard D. Schmidt; Thomas A. Marcoux; Daniel J. Donovan

[57]  ABSTRACT

An α, β-keto-imine having a nutty corn, cereal aroma which may be used as a flavoring composition for food and having the structure:

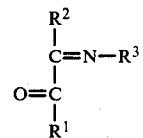

and $R^1$, $R^2$ and $R^3$ are selected from the group consisting of a saturated or unsaturated alkyl straight or branched chain hydrocarbon having from $C_1$ to $C_3$ carbon atoms but preferably having from $C_1$ to $C_2$ carbon atoms. Alternatively $R^3$ may also be $(CH_3)_n$-SH wherein n is 1 or 2.

10 Claims, No Drawings

FLAVORING WITH α, β-KETO-IMINES

BACKGROUND OF THE INVENTION

1. Field of the Invention

This invention relates to a flavoring compound for foodstuffs and a process for preparing the same.

2. Description of the Prior Art

Flavoring and compounds having cereal, toasted cereal, corny, nutty, bready characteristics are known and used within the food industry. However, to-date, keto-imines are not known to possess any useful properties let alone to possess such flavoring characteristics.

Articles published on the subject of cereal volatiles indicate that keto-imines have not been identified with such volatiles. Some of the more common and useful flavoring compounds are pyrazines and pyrrolizine along with their derivatives. Pyrazine and some pyrazine-derivatives are generally accepted as having a cereal, toasted, nutty character while pyrrolizine and some pyridine-derivatives have been identified as having a corny, nutty, bready character.

U.S. Pat. No. 2,533,723 issued to Dombrow discloses a reaction of alkyl ketones using an acid clay catalyst to produce an imine which is further reduced to form a secondary amine. The present invention reacts diketones under basic conditions to produce a keto-imine containing a conjugated carbonyl imine group. Dombrow has no conjugated carbonyl imine groups and the Dombrow product is an organic intermediate possessing no useful aroma.

The imine disclosed in U.S. Pat. No. 2,700,681 issued to Blomberg et al. is an alkyl or aralkyl imine for use as an intermediate in polymer, antioxidant or medical compounds. The Blomberg et al. imine has the structure of:

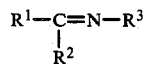

where $R^1$, $R^2$ and $R^3$ are alkyl or aromatic. The Blomberg et al. imines do not include the conjugated carbonyl imines.

The U.S. Pat. No. 3,625,710 issued to Rizzi does disclose a flavor. However, the products of Rizzi are imines from aldehydes and not diketones. Further, the Rizzi imine has the structure:

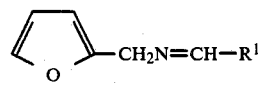

or $R^2-CH_2N=CH-R^3$ where $R^1$ is a branched alkyl group and $R^2$ and $R^3$ are isobutyl groups. Rizzi discloses the use of furfuryl amine as the nitrogen source. Further, the aroma of the Rizzi imine is chocolate.

None of the above inventions disclose the use of keto-imines as a flavoring compounds for use in food products and the like. The keto-imines produced by the present inventor possess a nutty corn, cereal flavor and can be incorporated into other food products thus imparting or enhancing an acceptable cereal flavor to said food products.

The objects of the present invention is therefore, a new flavoring compound for food and the like and a process for preparing the same.

SUMMARY OF THE INVENTION

The present invention relates to novel keto-imines as flavoring compounds. More particularly, the present invention discloses a flavor or aroma compound containing, α, β-keto-imines and a method for enhancing or imparting the aroma and/or flavor to food products using the same.

DETAILED DESCRIPTION OF THE INVENTION

The flavoring compounds produced in accordance with the present invention are keto-imines having the following structure:

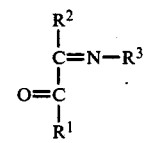

$R^1$, $R^2$ and $R^3$ are selected from the group consisting of a saturated or unsaturated alkyl straight or branched chain hydrocarbon having from $C_1$ to $C_3$ carbon atoms but preferably having from $C_1$ to $C_2$ carbon atoms.

An α, β-keto-imine produced in accordance with the present invention may be prepared by reacting a diketone such as diacetyl, with a primary amine such as methylamine. For example, diacetyl, also known as 2,3-butanedione can be made to react with methylamine to give the desired compound shown in Example I, by the following procedure. First, a mixture of diacetyl and a suitable solvent is cooled to approximately $-80°$ C. Into this solution methyl amine is condensed. The cooled mixture is stirred 10–15 minutes and then the temperature is allowed to rise to room temperature. Sodium sulfate may be added with stirring to dry the reaction and then filtered from the clear product. The solvent is removed under vacuum to produce a product with an intense corn, cereal aroma.

Another method for preparing the compound designated would be to react 2,3-pentanedione with methylamine or ethylamine.

When 2,3-pentanedione reacts with methylamine 2-Methylimino-3-pentanone and 3-Methylimino-2-pentanone of the present invention are produced.

The reactions may also be performed in a hydrophobic solvent such as ethanol if a water soluble product is desired.

The above mentioned reactions are presented structurally below:

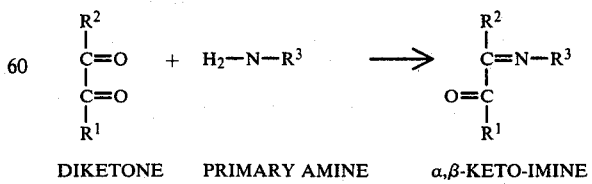

DIKETONE   PRIMARY AMINE   α,β-KETO-IMINE wherein $R^1$, $R^2$ and $R^3$ are saturated or unsaturated alkyl straight or branched chain hydrocarbons having from $C_1$ to $C_3$ carbon atoms.

The α,β-keto-imines of this invention can be used as aromas and flavor for foodstuffs such as cereals, corn chips, tortillas, etc. The flavor characteristics of these compounds enable their use in finished products at levels that range between 0.1 to 500 ppm, with the preferred range being between 1 to 100 ppm. The α,β-keto-imines can be mixed with other carrier materials and/or diluents, or if desired with other flavor-imparting ingredients to form aroma or flavor agents which may be conferred to foodstuffs or which may intensify such flavors. The α,β-keto-imines can be formulated as liquids, pastes or powders. These products can, for example, by spray-dried, drum dried or vacuum dried with a carrier such as maltodextrin. Alternatively, the product can be diluted in an inert liquid carrier such as a triglyceride or a vegetable oil.

The following examples are given by way of illustration only and are not to be construed as limiting the invention in any way.

EXAMPLE I

A mixture of 1.7 gm. diacetyl and 8 ml. Freon 113 was cooled to −80° C. 0.7 gm. methyl amine was condensed into the solution. The cooled mixture was stirred for 10 minutes and then the temperature of the mixture was allowed to rise to 20° C. While stirring, about 1 gram of sodium sulfate was added to remove water and the clear product was filtered off. The solvent was removed under vacuum producing a product with an intense corn, cereal aroma.

The structure of the product obtained was confirmed by infra red, mass spectral and NMR analysis to be:

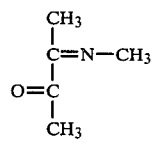

2-Methylimino-3-butanone

EXAMPLE II

A mixture of 3.6 gm. methyl amine and 18 gm. ethanol was cooled to −80° C. as was a mixture of 11.6 gm. 2,3-pentanedione in 6 gm. ethanol. These two solutions were combined with stirring and held at −80° C. for 10 minutes. The temperature was allowed to rise to room temperature with continuous stirring and held at room temperature for 15 minutes. 150 gm. water was added along with 125 mg. BHA and 60 gm. Frodex ™ (a maltodextrin). This mixture was spray dried to produce a stable product possessing a cereal, nutty character.

Upon analysis it was found that two products resulted from this reaction in the percentages and with the structures shown below:

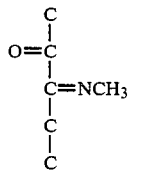 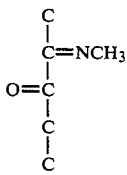

3-Methylimino-2-pentanone   2-Methylimino-3-pentanone
(20%)                       (80%)

EXAMPLE III

The reaction produced in Example I was diluted to 320 gm. with Freon 113. 0.2 gm. of this dilution was topically applied (by spraying) onto 100 gm. of a commercial corn flake cereal was well as on 100 gm. of a corn chip snack product. The concentration of the keto-imine thus applied was approximately 10 ppm. Samples were evaluated by odor and taste at zero time, at 10 days and at 35 days. The samples were compared to an untreated control. Both experimental products were found to have an improved, more intense corn character than the control.

EXAMPLE IV

The reaction described in Example I was repeated, the Freon removed under vacuum, and the product diluted with 100 gm. corn oil. 20 mg. of this dilution was applied to the package liner of a box of corn flakes.

After several days the package aroma of this product was compared to an untreated control. The box aroma of the experimental sample was found to be superior and more flake like.

EXAMPLE V

A reaction between 5 gm. diacetyl and 2.1 gm. methyl amine was performed as described in Example II (in ethanol). The product was not diluted and spray dried, rather, the alcoholic solution was combined with 12.5 lb. of a cereal flavor syrup. This flavor syrup was combined with 50 lb. of a corn/rice flour cereal base in a twin screw extruder. The mixture contained a 250 ppm concentration of the keto-imine. The product was extruded, pelletized, flaked and toasted to produce a flaked cereal. This product was compared to an untreated control. The experimental product was found to have a more intense corn, buttery, cereal aroma with high impact.

What is claimed is:

1. A composition comprising a foodstuff and a flavoring compound in an amount to impart a cereal, nutty corn character wherein said compound has a structure selected from the group of α,βKeto-imines consisting of:

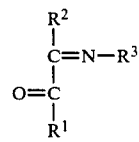

wherein
$R^1$ is a saturated or unsaturated alkyl straight or branched chain hydrocarbon having from $C_1$ to $C_3$ carbon atoms;
$R^2$ is a saturated or unsaturated alkyl straight or branched chain hydrocarbon having from $C_1$ to $C_3$ carbon atoms;
$R^3$ is a saturated or unsaturated alkyl straight or branched chain hydrocarbon having from $C_1$ to $C_3$ carbon atoms.

2. A composition of claim 1 wherein said compound is 2-Methylimino-3-butanone.

3. A composition of claim 1 wherein said compound is 2-Methylimino-3-pentanone.

4. A composition of claim 1 wherein said compound is 3-Methylimino-2-pentanone.

5. A composition of claim 1 wherein said compound is in the range from about 0.1 to 500 ppm.

6. A composition of claim 5 wherein said compound is in the range from about 1 to 100 ppm.

7. A composition as claimed in claim 1 wherein said compound is combined with an edible oil.

8. A composition as claimed in claim 1 wherein said compound is in combination with other flavor ingredients.

9. A composition as claimed in claim 1 wherein said compound is fixed with a carrier.

10. A foodstuff as claimed in claim 9 wherein said carrier is moltodextrin.

* * * * *